(12) United States Patent
Hubbe et al.

(10) Patent No.: US 6,278,885 B1
(45) Date of Patent: Aug. 21, 2001

(54) MOBILE PHONE USING SUBSCRIBER IDENTIFICATION CARD FOR UPDATING INFORMATION STORED THEREIN

(75) Inventors: Pascal Hubbe, Paris; Christian Orsini, Sevres, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/138,659

(22) Filed: Aug. 24, 1998

(30) Foreign Application Priority Data

Aug. 25, 1997 (FR) .................................................. 97 10601

(51) Int. Cl.⁷ ........................................................ H04Q 7/32
(52) U.S. Cl. ............................................. 455/558; 455/466
(58) Field of Search ................................. 455/466, 553, 455/558, 559, 550, 566, 551

(56) References Cited

U.S. PATENT DOCUMENTS

| | | | |
|---|---|---|---|
| 5,418,837 | * 5/1995 | Johansson et al. | 455/558 |
| 5,687,216 | * 11/1997 | Svensson | 455/558 |
| 5,875,404 | * 2/1999 | Messiet | 455/558 |
| 5,933,773 | * 8/1999 | Barvesten | 455/411 |
| 6,011,976 | * 1/2000 | Michaels et al. | 455/466 |
| 6,055,442 | * 4/2000 | Dietrich | 455/558 |

FOREIGN PATENT DOCUMENTS

| | | |
|---|---|---|
| 0 555 992 A1 | 8/1993 | (EP) . |
| 0 562 890 A1 | 9/1993 | (EP) . |
| 0 675 659 A1 | 10/1995 | (EP) . |
| 0 748 135 A2 | 12/1996 | (EP) . |
| 0 789 500 A2 | 8/1997 | (EP) . |
| 2 296 801 | 7/1996 | (GB) . |
| WO 95/06996 | 3/1995 | (WO) . |
| WO 96/27270 | 9/1996 | (WO) . |

* cited by examiner

Primary Examiner—Edward F. Urban
(74) Attorney, Agent, or Firm—Sughrue, Mion, Zinn, Macpeak & Seas, PLLC

(57) ABSTRACT

A mobile phone uses a subscriber identification card which includes memory used by the mobile phone as external auxiliary memory. The mobile phone itself includes memory and can transfer data from the card's memory to the phone's memory. The card executes commands for updating data contained in the card's memory which is transmitted by short mobile phone messages to the mobile phone and eliminates the commands contained in the short messages after they are executed. The mobile phone can detect if data has been eliminated from a short message by the subscriber identification card and triggers the phone's memory to transfer data when elimination of data has been detected.

5 Claims, 1 Drawing Sheet

MOBILE PHONE USING SUBSCRIBER IDENTIFICATION CARD FOR UPDATING INFORMATION STORED THEREIN

BACKGROUND OF THE INVENTION

1. Field of the Invention

The invention concerns mobile phones, in particular portable mobile phones, using a subscriber identification card and in particular those designed to receive commands sent by a service provider in short mobile phone messages, in particular updating commands.

2. Description of the Prior Art

Given the rate of change in fields employing data processing means in particular, it is beneficial for equipment employed by users to be capable of being updated if necessary.

Some methods of operating subscriber identification card mobile phones imply staggering in time of updates to information stored on the cards to the benefit of their users. These updates concern directory information stored in subscriber identification cards for mobile phones of particular interest for a given category of mobile phone users, such as directory information concerning employees of the same company. Such updates staggered in time are also encountered when the cards are used for pre-payment operations implying charging the card with payment units beforehand and recharging the card with such units when the units previously stored have been used up.

Document FR-A-2718263 describes an automatic charging device to which mobile phones are connected to update their control software. A solution of this kind, which may suit some mobile phone operating conditions, is not necessarily practical if the mobile phones are likely to be very widely dispersed geographically. It is efficient only if users can find a charging device within a reasonable distance and if users find the conditions of using any such device acceptable.

Document EP-A-478231 describes a solution to the problem of quickly and efficiently programming a mobile phone using signals transmitted by radio to the radio receiver of the mobile phone from a control center after the user switches the mobile phone to a programming mode to obtain specific mobile service authorization codes. Obtaining these codes is subordinate to the user calling the control center in at least two of the examples described.

Although a solution of the above kind may be suitable in the case of the first entry into service or a request for updating at the initiative of a user, it is not totally satisfactory if the user is not aware that updating their mobile phone is necessary or advantageous.

Commands and information to be displayed can be transmitted to mobile phones using a processor and memory subscriber identification card, and in particular to GSM type mobile phones, via the mobile phone network by a Short Message Service (SMS). The information is to be displayed by the mobile phone and the commands are addressed to a processor, for example the processor on the card. The processor on the card can therefore be used to update the cards, and therefore the mobile phones, via the mobile phone network, as soon as a mobile phone link is set up between a mobile phone and the network. The control structure of the network can be organized in such a way that it is possible to tell if a mobile phone connected to said network has received the updates it needs or not. It is then possible to update the mobile phones of a network automatically as soon as the mobile phones are connected to the network, in accordance with any updates that have come into force.

A solution of the above kind is not without disadvantages, however, given that mobile phones using microprocessor and memory subscriber identification cards as currently on sale generally take account only of information that is present when the respective mobile phones are switched on. This can be very irritating for users who see information displayed that does not correspond to the current situation of the mobile phone displaying the information. For example, if the subscriber identification card of a mobile phone stores prepayment units and if the user has used the mobile phone to carry out a prepayment unit recharging operation, it is possible that the number of prepayment units displayed by the mobile phone after recharging is still the number which would have been displayed before recharging if the mobile phone has not been switched off in the meantime.

Similarly, directory information displayed by a mobile phone may be inaccurate and therefore lead to errors if an update to the subscriber identification card sent by radio was implemented when the mobile phone was already switched on.

SUMMARY OF THE INVENTION

The invention therefore proposes a mobile phone adapted to co-operate with a subscriber identification card, which is usually removable, the card including memory type first means used by the mobile phone as external auxiliary memory, said mobile phone including memory type second means and third means for transferring data from the first means to the second means, said card including fourth means enabling it to execute update commands relating to data contained in the first means transmitted to the mobile phone in the form of data by short radio messages and fifth means for eliminating data corresponding to commands contained in the short messages received when the commands have been executed.

In accordance with one feature of the invention the mobile phone further includes sixth means for detecting if data has been eliminated from a short message by the subscriber identification card and seventh means for triggering said third means to transfer data when the sixth means have detected elimination of data.

The invention, its features and its advantages are explained in the following description with reference to the figures listed below.

DETAILED DESCRIPTION OF THE PREFERRED EMBODIMENT

Figure 1:
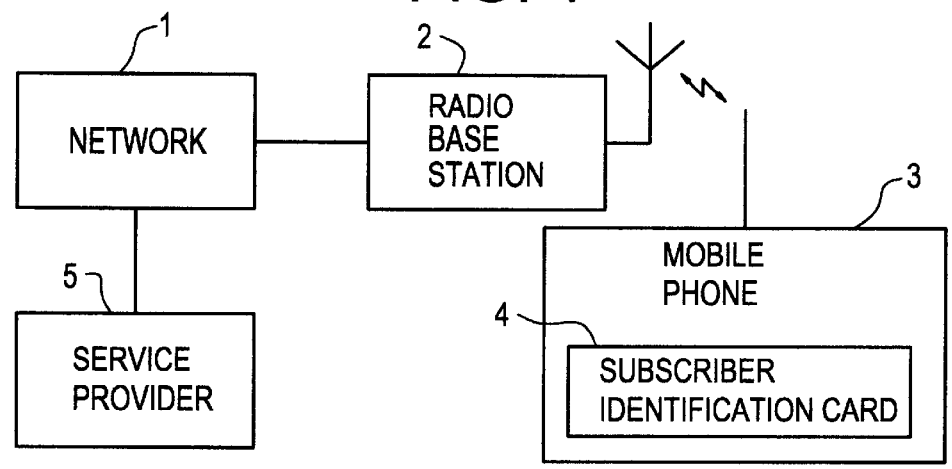
FIG. 1 is a block diagram relating to a system for transmitting commands by radio to identification card mobile phones.

The system shown in FIG. 1 is based on a telecommunication network 1, at least part of which is a mobile phone network, which includes a plurality of mobile phone base stations, usually fixed and symbolized by a base station 2, adapted to relay communications to mobile phones, symbolized by mobile phone 3, so that users of the mobile phones can communicate with remote telephone or mobile phone users via the network. The mobile phones 3 have each to be fitted with a subscriber identification card 4 before they can be used. These cards are, for example, SIM (Subscriber Identity Module) cards that are accommodated in the mobile phones to which they are connected to enable transmission. Each subscriber identification card 4 includes digital data processing means, conventionally a programmable and appropriately programmed microprocessor, and memory means associated with the processor on the card.

Each mobile phone includes interface means for exchange of data with a subscriber identification card having complementary interface means. It includes its own data processing means and memory means for cooperating with corresponding means on a card. Mobile phone send-receive equipment enables each mobile phone to communicate with the mobile phone base stations within the radio range of which it is located and in particular to enable connection to the telecommunication network 1 of the processing and memory means on the identification card fitted to it and its own such means. This enables this mobile phone to communicate with other telephone or mobile phones via the telecommunication network 1 and in particular to communicate with the service provider from which it obtains, either directly or indirectly, the subscriber identification card it is using, the service provider being connected to the telecommunication network by at least one communication unit 5. Here the communication unit is adapted to send commands, in particular updating commands, to mobile phones in the form of digital data included in short radio messages transmitted by the telecommunication network 1 and in particular the base stations 2 of the network.

Figure 2:
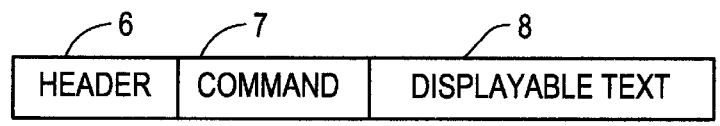
FIG. 2 shows the format of a short message for transmitting commands by radio.

The mobile phones concerned are, for example, mobile phones of GSM, DCS or PCS networks fitted with SIM cards having means for filtering information that they receive by radio, in particular in the context of class 2 SMS short messages. As shown in FIG. 2, here the command short messages include a first part called the header 6 which in particular identifies the addressee, a second part 7 containing the command data and in particular the update command data, and a third part 8 containing data to be displayed on the display screen of the mobile phone.

Figure 3:
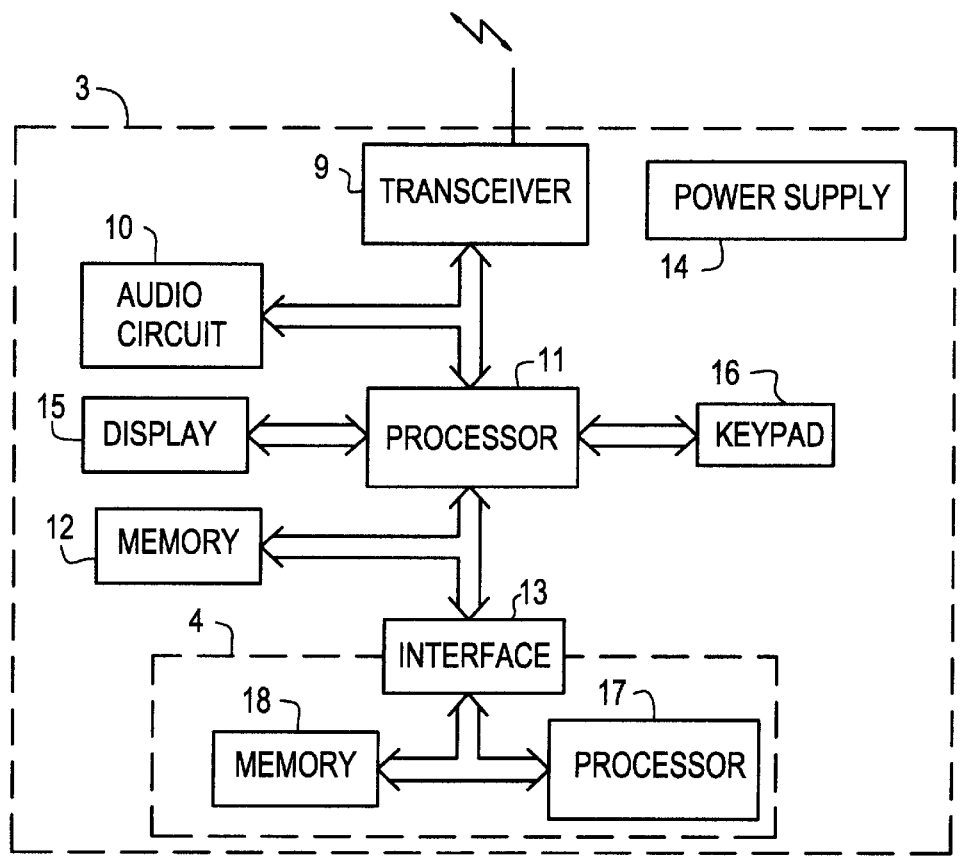
FIG. 3 is a block schematic of a subscriber identification card mobile phone modified in accordance with the invention.

In accordance with the invention, as previously mentioned and as shown in FIG. 3, the mobile phone 3 fitted with a subscriber identification card 4 is designed to assure that the data displayed by the display screen of the mobile phone is up to date, even if a modification affecting it has just been done by the card on reception of a short message by the mobile phone.

To this end, additional means are incorporated into the mobile phone which already includes various other means referred to in part hereinabove.

In particular the mobile phone 3 includes a transceiver 9 for transmitting the various signals exchanged by radio between the mobile phone and the base station 2 with which it is communicating and in particular short messages that the latter station may send it. The transceiver is connected to an audio circuit 10 handling at least some of the processing of signals corresponding to sounds to be transmitted by radio and signals to be converted to audible form to the benefit of the user and to processing means 11 based on at least one appropriately programmed processor also able to handle some of the processing of the send or receive signals.

Memory means 12 are associated with the processing means in the mobile phone. They include buffer devices, not shown, in which short messages such as the class 2 SMS messages referred to above, are stored for transmission to the subscriber identification card 4 incorporated in the mobile phone when they contain commands to be acted on by the card. As mentioned above, these commands can be used to recharge prepayment units stored in the card memory or to update a directory when the corresponding data is also stored in the card memory.

The identification cards include memory means that can be used as external memory by the processing means 11 of the mobile phone. This is known in itself. The data stored in the card enables a user having a subscriber identification card to use different mobile phones by moving the card from one mobile phone to another, as required, for which there is usually simple provision. This is also known in itself.

For communication with an identification card, a mobile phone 3 includes interface means 13 that it shares with the card for their exchanges of data in a form that is usually electrical via connecting members that are not shown. The mobile phone also includes a power supply unit 14 which powers its components and those of the card, a display 15 and a user interface keypad 16.

As mentioned above, a subscriber identification card essentially includes processing means 17, conventionally implemented in the form of an appropriately programmed microprocessor associated with memory means 18 at least some of which are accessible from a mobile phone 3 via a shared access interface 13. This is known in itself.

When, as referred to hereinabove, a short message including command data addressed to the subscriber identification card 4 fitted to a mobile phone 3 is received by the mobile phone the processing means 11 of the mobile phone instigate the storage of the message in the buffer devices referred to above of the memory means 12 of the mobile phone and transfer the message to the card 4 via the access interface 13.

The processing means 17 of the card 4 execute the commands contained in the short message that they receive which leads to elimination of the data corresponding to these commands from the short message containing it. Only the header part 6 and the part 8 containing the data for display on the display 15 of the mobile phone 3 then remain in the short message in the memory means 18 of the card.

The mobile phone 3 includes in its processing means 11 software means enabling it to recover the parts 6 and 8 of the short message acted on by the card to display the part 8 on the display 15.

There is therefore provision for adding software and/or hardware means to the processing means 11 to detect if data has been eliminated by the card 3 from a short message received by the mobile phone and transmitted to the card. This detection can easily be obtained by comparing the short message data in the buffer devices referred to above of the memory means 12 of the mobile phone and that of the message still present after the commands from said message have been executed by the card. Transfer software means are therefore provided to enable the processing means 11 to recover message data still present in the card. The transfer is then used to update the card image data stored in the memory means 12 of the mobile phone in order to show them on the display of the mobile phone so that the user display always corresponds to the last update done.

What is claimed is:

1. A mobile phone adapted to use a subscriber identification card, comprising:
   a first memory in the subscriber identification card, said first memory used by said mobile phone as an auxiliary memory;

a second memory in said mobile phone;

transfer software for transferring first data from said first memory to said second memory;

a processor in the subscriber identification card to execute update commands relating to data contained in said first memory, said update commands being transmitted to said mobile phone in the form of second data via short radio messages;

means for eliminating said second data corresponding to said commands contained in said short messages when said commands have been executed by said processor;

a detector in said mobile phone for detecting if said second data has been eliminated from a short message by said subscriber identification card; and means for triggering said transfer software to transfer said first data when said detector has detected that said second data has been eliminated from said short message.

2. The mobile phone claimed in claim 1, wherein said second memory comprises buffer devices and wherein said detector compares data from said message as received and stored in said buffer devices of said second memory of said mobile phone and data from said message after said message has been processed by said card.

3. A mobile phone, comprising:

a first memory to store a short message received by the mobile phone, the short message containing an update command and data related to said update command;

a first processor to initiate the storage of the short message in the first memory;

a subscriber identification card, having:

a second processor to execute the update command and to eliminate the update command from the short message; and a second memory containing data to be updated by the update command;

a detector to detect the elimination of the update command from the short message; and recovery software associated with the first processor and responsive to said detector to recover said related data after the update command contained in the short message has been executed by the second processor.

4. A method of updating information stored in a mobile phone, comprising:

in the mobile phone, receiving and storing a short message containing at least one update command for updating the information stored in the mobile phone, said short message further containing data associated with said update command;

transmitting the short message to a subscriber card in the mobile phone;

in the subscriber card, executing the update command to update the information stored in the mobile phone and eliminating the update command from the short message;

detecting if the the update command has been eliminated from the short message; and storing said associated data in the mobile phone.

5. The method of claim 4, wherein, in the detecting step, at least a portion of the short message as received by the mobile phone is compared with a corresponding portion of the short message after the update command has been executed in said subscriber card.

* * * * *